US008964696B2

(12) United States Patent
Mariblanca Nieves (10) Patent No.: US 8,964,696 B2
(45) Date of Patent: Feb. 24, 2015

(54) TRAFFIC CONTROL FOR ROAMING SUBSCRIBERS (75) Inventor: David Mariblanca Nieves, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 724 days.

(21) Appl. No.: 13/202,295

(22) PCT Filed: Feb. 19, 2009

(86) PCT No.: PCT/EP2009/051988
§ 371 (c)(1),
(2), (4) Date: Aug. 18, 2011

(87) PCT Pub. No.: WO2010/094334
PCT Pub. Date: Aug. 26, 2010

(65) Prior Publication Data
US 2011/0299395 A1 Dec. 8, 2011

(51) Int. Cl.
*H04W 4/00* (2009.01)
*H04W 28/12* (2009.01)
*H04L 12/54* (2013.01)
*H04L 12/801* (2013.01)
*H04L 12/911* (2013.01)
*H04L 12/923* (2013.01)
*H04L 12/927* (2013.01)
*H04W 88/16* (2009.01)

(52) U.S. Cl.
CPC ........... *H04W 28/12* (2013.01); *H04L 12/5695* (2013.01); *H04L 47/11* (2013.01); *H04L 47/12* (2013.01); *H04L 47/14* (2013.01); *H04L 47/745* (2013.01); *H04L 47/762* (2013.01); *H04L 47/781* (2013.01); *H04L 47/805* (2013.01); *H04L 47/822* (2013.01); *H04L 47/824* (2013.01); *H04W 88/16* (2013.01)
USPC ........................................... 370/331; 455/443

(58) Field of Classification Search
None
See application file for complete search history.

(56) References Cited

U.S. PATENT DOCUMENTS

| 2007/0226775 | A1 | 9/2007 | Andreasen et al. |
| 2008/0046963 | A1* | 2/2008 | Grayson et al. .................... 726/1 |
| 2008/0192638 | A1* | 8/2008 | Massiera et al. ............. 370/237 |
| 2009/0037999 | A1* | 2/2009 | Anderson et al. ............... 726/12 |
| 2011/0246586 | A1* | 10/2011 | Steele ........................... 709/206 |
| 2013/0132854 | A1* | 5/2013 | Raleigh et al. ................ 715/738 |
| 2014/0040975 | A1* | 2/2014 | Raleigh et al. .................... 726/1 |

FOREIGN PATENT DOCUMENTS

| EP | 1233640 A2 | 8/2002 |
| EP | 1670273 A1 | 6/2006 |

* cited by examiner

*Primary Examiner* — Ashley Shivers
(74) *Attorney, Agent, or Firm* — Coats & Bennett, PLLC (57) ABSTRACT A method of controlling load within a cellular telecommunications network due to packet data traffic, where packet data traffic associated with subscribers roaming in said network is broken out to respective access gateways in the subscribers home networks. The method comprises, within said cellular telecommunications network, identifying peer networks whose subscribers are currently roaming in the network. Upon detection of a congestion event within the network, a notification is caused to be sent to one or more of said peer networks. Upon receipt of the notification at the or each peer network, a reduction in the packet data traffic bandwidth available to those of said roaming subscribers belonging to the peer network is caused, wherein the packet data traffic associated with those subscribers in said cellular telecommunications is reduced.

23 Claims, 8 Drawing Sheets

TRAFFIC CONTROL FOR ROAMING SUBSCRIBERS

TECHNICAL FIELD

The present invention relates to traffic control for roaming subscribers in a telecommunications system. More particularly, the invention relates to the application of home network based traffic control to roaming subscribers.

BACKGROUND

Modern telecommunication systems may incorporate Policy and Charging Control (PCC) architectures. A PCC architecture is described in 3GPP TS 23.203 V7.9.0 in respect of packet flows in an IP-CAN session established by a user equipment UE through a 3G telecommunications system. The particular architecture comprises: a Policy and Charging Rules Function (PCRF) and a Policy and Charging Enforcement Function (PCEF). The PCRF behaves as a Policy Decision Point (PDP) or Policy Server (PS), and the PCEF behaves as a Policy Enforcing Point (PEP). Whilst the PCRF can be implemented as a standalone node, the PCEF is preferably co-located within an Access Gateway (AG) such as a GPRS Gateway Support Node (GGSN) in a General Packet Radio Service (GPRS) core network. Such an architecture is illustrated schematically in FIG. 1, where BSS represents the Base Station Subsystem of a radio access network (e.g. GERAN or UTRAN). In a CDMA network, the AG may be a Packet Data Serving Node (PDSN). Related architectures are provided for 3GPP2 networks and TISPAN Next Generation Networks.

In the case of a PCEF co-located with a GGSN, the GGSN is responsible for inspecting data packets associated with data flows originating at and/or terminating in a user terminal served by the GGSN. In the case of a subscriber roaming into a "visited" network, the GGSN assigned to route data packets related to the (roaming) terminal is located in the subscriber's home network.

When a User Equipment (UE) initiates a data session, an IP address is assigned to it by an appropriate AG. The AG provides this IP address, together with, for example, an NAI, IMSI, or MSISDN, to the PS which in turn downloads into the AG a set of policy rules to be applied to the data session. When the UE communicates with a (final) Application Function (AF), the AF may provide session details to the PS. When the UE subsequently requests connectivity for the service provided by the AF, then the AG informs the PS, which downloads into the AG policy rules for the connection(s) required. In a 3GPP network, the AF may be a Proxy Call Session Control Function, P-CSCF, or another kind of application server to which the UE establishes an application communication via bearer(s) set up via IP-CAN session(s) through the AG.

Figure 2:
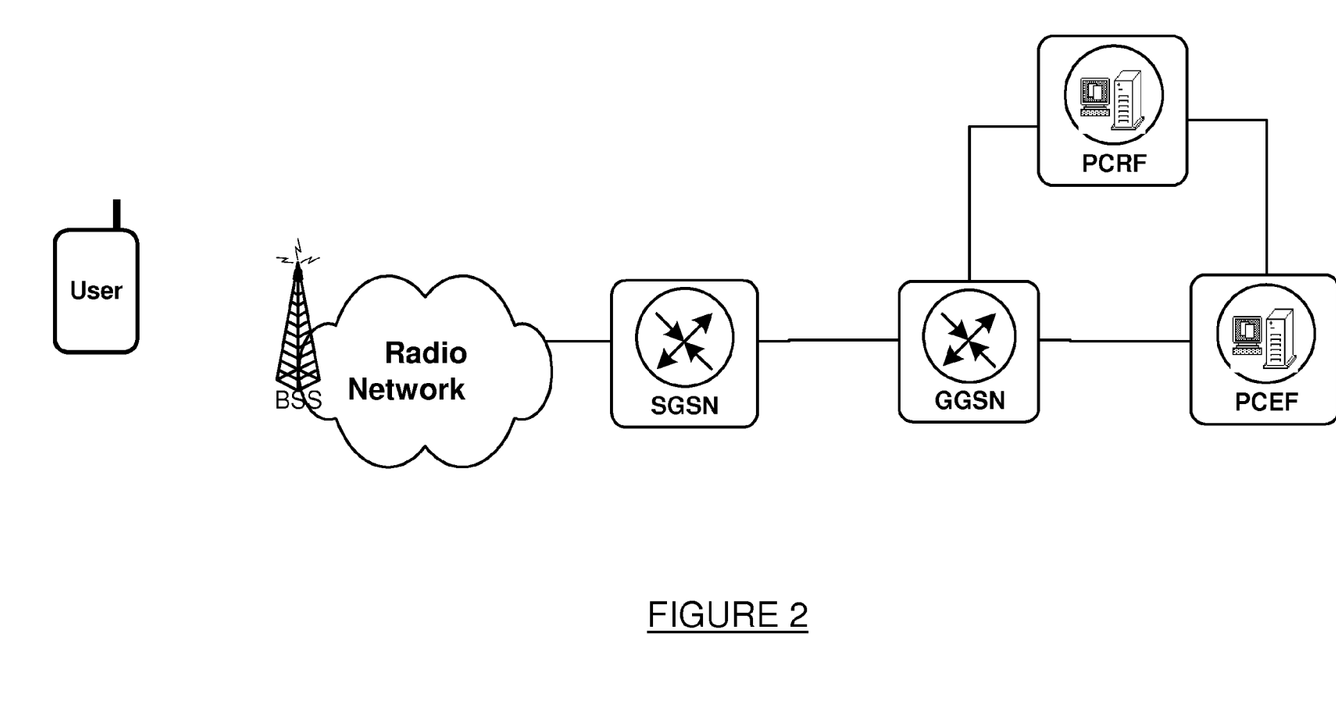
FIG. 2 illustrates schematically a generic PCC architecture within a 3G network, with a split GGSN/PCEF function.

FIG. 2 illustrates an architecture where the PCEF functionality is implemented on a separate physical machine. In this approach, the policy enforcement responsibilities are delegated to the GGSN or to the PCEF based on their respective roles in the network. As defined in GPRS, the GGSN is able to control PDP contexts, user attachments, etc., so the GGSN will control these types of parameters. The PCEF on the other hand is able to detect IP flows, service patterns (e.g. whether traffic relates to VoIP), etc., so it will be in charge of these types of settings.

In the split architecture of FIG. 2, the PCRF receives traffic information from the PCEF (the same traffic traverses the GGSN and the PCEF, so it is sufficient if only the PCEF reports traffic information). This traffic information may be for example aggregate traffic usage levels, or usage per user per service. The PCRF must then be able to distinguish which policy actions must be sent to the GGSN and which ones to the PCEF. As far as the PCEF is concerned, when it detects that a user bearer session has been initiated (PDP) context, it will download from the PCRF an Access Control List for the user. This list indicates services allowed or barred for the user. As already noted, policy actions include:

For the PCEF: policy actions such as service blocking, bandwidth throttling, introduction of latency, etc. In summary, actions that can be applied to an IP flow (for example, to an HTTP browsing session)

For the GGSN: policy actions that can be applied to a PDP context, and that will eventually be propagated to the radio network using standard GPRS mechanisms. For example, parameters like Traffic Handling Priority or Guaranteed Bit Rate, can be set by the PCRF and instructed to the GGSN A PCC service known as "Service Aware Charging and Control" (SACC) is provided by Ericsson A B (Stockholm, Sweden). This relies upon an architecture comprising, among other components, two functional entities/nodes, called "SAPC" and "SASN". These nodes parallel the functions of, respectively, a PCRF and a PCEF. SACC allows GPRS network operators to analyze user-generated traffic, and enforce certain actions depending on many different factors, for example; type of traffic, user subscription, time of the day, etc. Actions to be taken include; block traffic, charge traffic, change Quality of Service (QoS), etc. By way of example, SACC could allow a network operator to define the conditions and actions shown in Table 1 below.

SACC includes a feature referred to as QBAL (Quality of Service Based on Aggregated Load). This feature allows an operator to control the QoS based on the aggregated traffic load, and change the QoS accordingly. Here, "aggregated traffic load" means the amount of bandwidth that is being used by a subscriber at a certain moment. For example, if a subscriber is using a Voice over IP (VoIP) service at 200 kbps, and at the same time is browsing the Internet at 100 kbps, the aggregated traffic load is 300 kbps. Of course, the aggregated traffic load can be measured for a subset of subscribers within a cell, or across an entire cell (i.e. the sum of the aggregated traffic load of the subscribers in that cell), by time of day (aggregated load for all subscriber in peak hours), etc.

Consider by way of example an operator who has network cells in urban areas and within which a lot of traffic is generated. This may give rise to corporate (business) subscribers not having available an acceptable bandwidth during business hours. A solution is for the operator to implement an "accumulator", the role of which is to measure the bandwidth being used by all subscribers in a given cell. When a certain (predefined) bandwidth limit is reached, the QoS for the subscribers in that cell is lowered to prevent congestion. This approach may however result in a bandwidth reduction for all subscribers, regardless of the actual current usage. This can be mitigated in a number of ways, for example; lowering the QoS only to the "bronze" subscribers, but keeping the "gold" subscribers untouched; lowering the QoS only for certain services like Skype™, etc.

Figure 1:
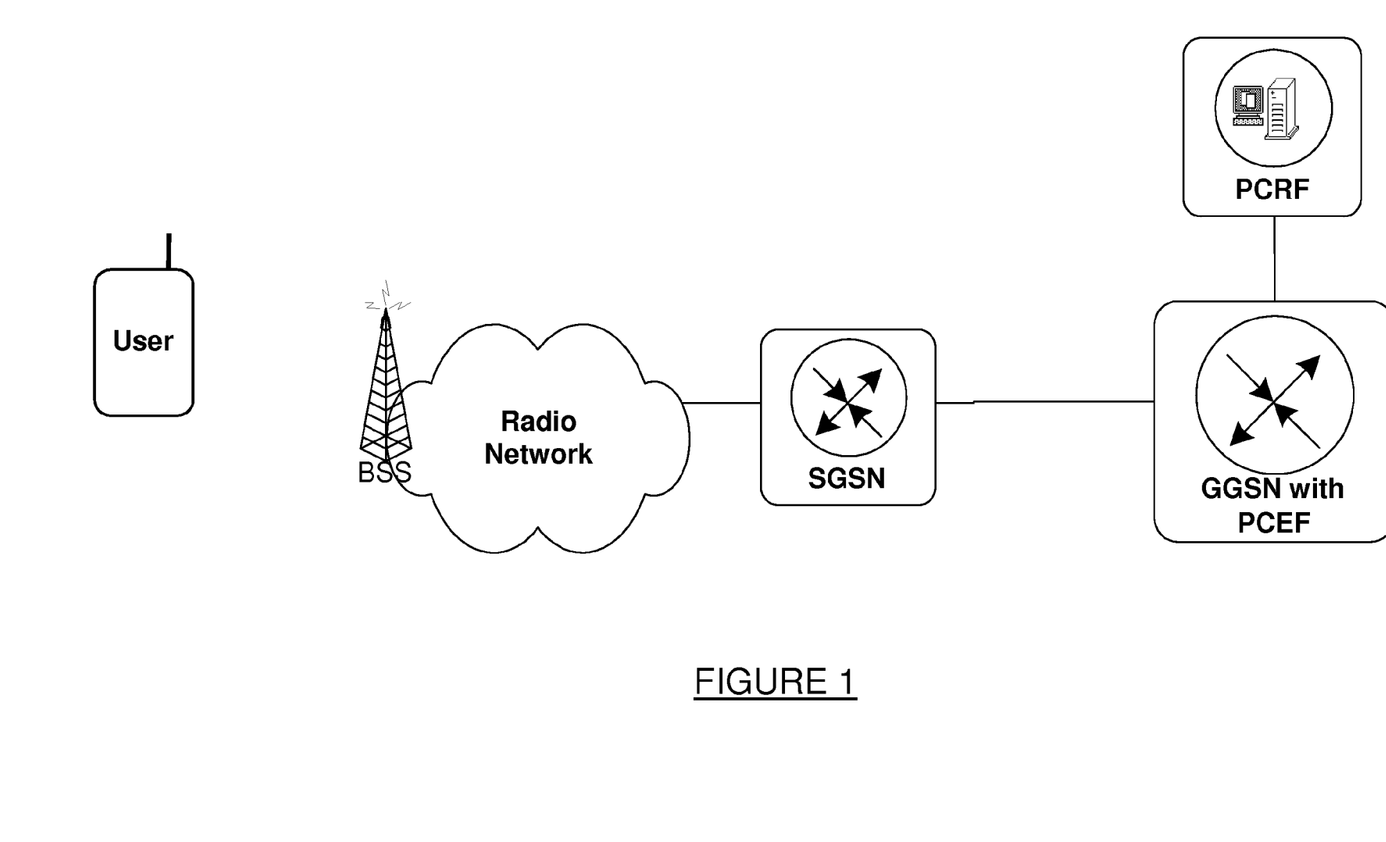
FIG. 1 illustrates schematically a generic PCC architecture within a 3G network, with a combined GGSN/PCEF function.

With reference to the co-located architecture of FIG. 1, QBAL can work either in the GGSN/PCEF locally, or in cooperation with the PCRF. The main difference is that, for the local approach, the GGSN/PCEF does not have per-subscriber control. In particular, as the PCEF does not store subscription information per subscriber, it can only apply QBAL based on certain global parameters.

Considering firstly the local approach, Table 2 below shows an example rule set based on total aggregated load per cell. The GGSN/PCEF continuously updates the third column of the table, and when a limit is reached, performs the action in the fourth column. Consider for example the cell with ID 10998-1. It is clear that this cell may well reach its aggregated load limit very soon. When the 40 Mbps limit is reached, subscribers within that cell will only be able to use HTTP browsing. Any other services (VoIP, streaming, etc) will be blocked QBAL may also apply subscription information received by nodes (other than the GGSN/PCEF) to make traffic handling decisions. For example, a Charging Characteristics parameter may be provisioned initially per subscriber in the HLR, then sent to the SGSN, and finally sent to the GGSN. A UE includes the Charging Characteristics parameter in a PDP context activation. This parameter can be used to assign the subscriber to a certain subscriber group, e.g. Gold, Silver or Bronze. The GGSN/PCEF can then be configured to allow Gold subscribers to have a higher limit of aggregated load than Silver subscribers and so on. A suitable configuration table is included as Table 3 below. Once the GGSN/PCEF detects a new PDP context activation, it will extract the Charging Characteristics parameter, and classify the subscriber session into one of the categories in the first column. It will then start counting the traffic load and accumulating it to the counter of his/her category (third column). Once the limit set in the second column is reached, the GGSN/PCEF will take the action specified in the fourth column of the Table.

Figure 3:
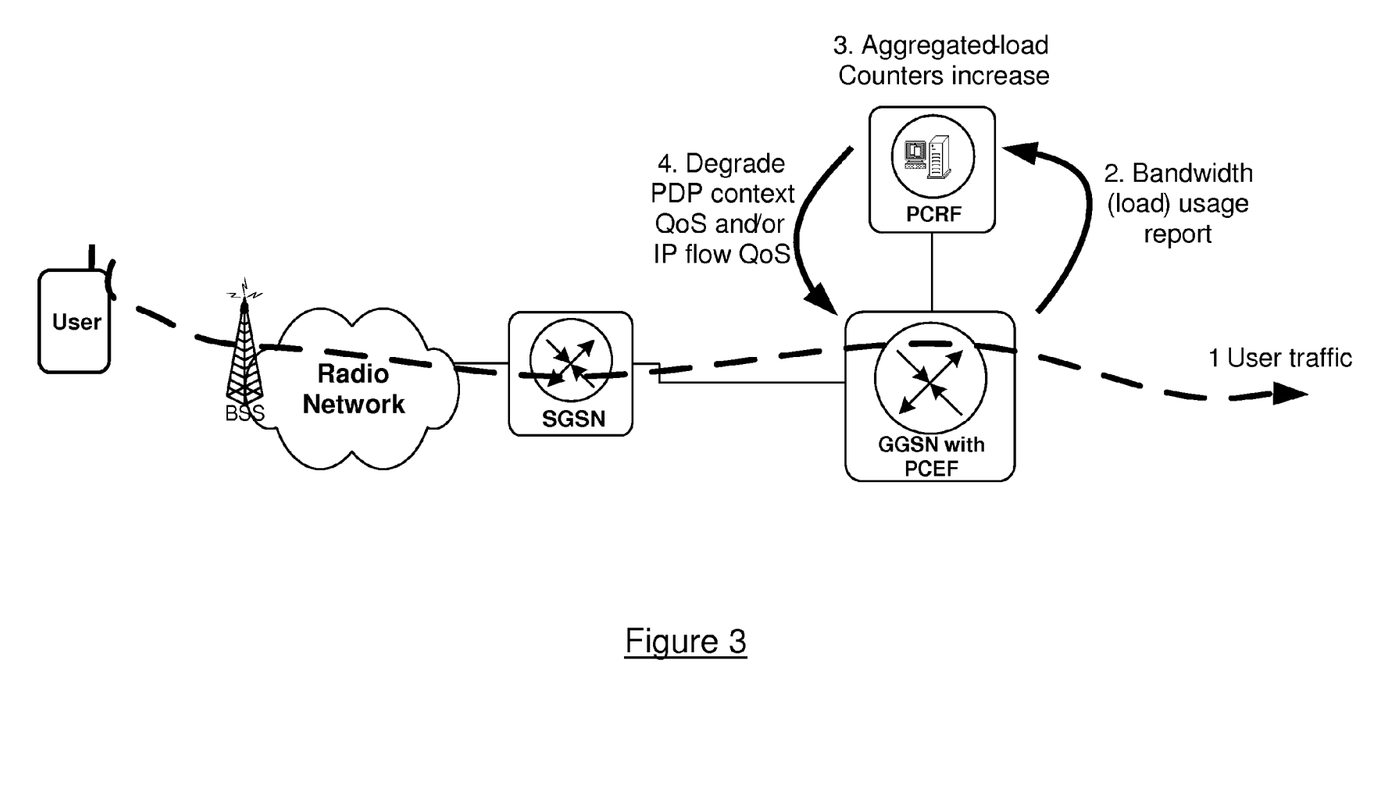
FIG. 3 illustrates schematically a QoS/load control mechanism incorporated into the architecture of FIG. 1.

Considering now a scenario in which the GGSN/PCEF interworks with the PCRF to implement the QBAL service, control over subscriber load can be made more accurate since the PCRF can keep separate, aggregated load counters per subscriber and compare them with provisioned subscriber limits. For example, for a given subscriber, the following settings can be provisioned in the PCRF for a premium (Gold) subscriber:

Profile: Gold
    Maximum aggregated load for peak hours: 1 Mbps Load threshold exceeded: Throttle down to 800 kbps
    Maximum aggregated load for VoIP: 400 kbps Load threshold exceeded: Throttle down to 300 kbps According to this provisioning data, the PCRF will reduce the bandwidth available to a Gold subscriber if he exceeds 1 Mbps of traffic in peak hours, or will reduce the available VoIP bandwidth to 300 kbps if he exceeds 400 kpbs when using VoIP services. The usage of these services is reported by the GGSN/PCEF to the PCRF. The GGSN/PCEF is also responsible for enforcing the decision made by the PCRF. FIG. 3 illustrates schematically the operation of this control mechanism.

Figure 4:
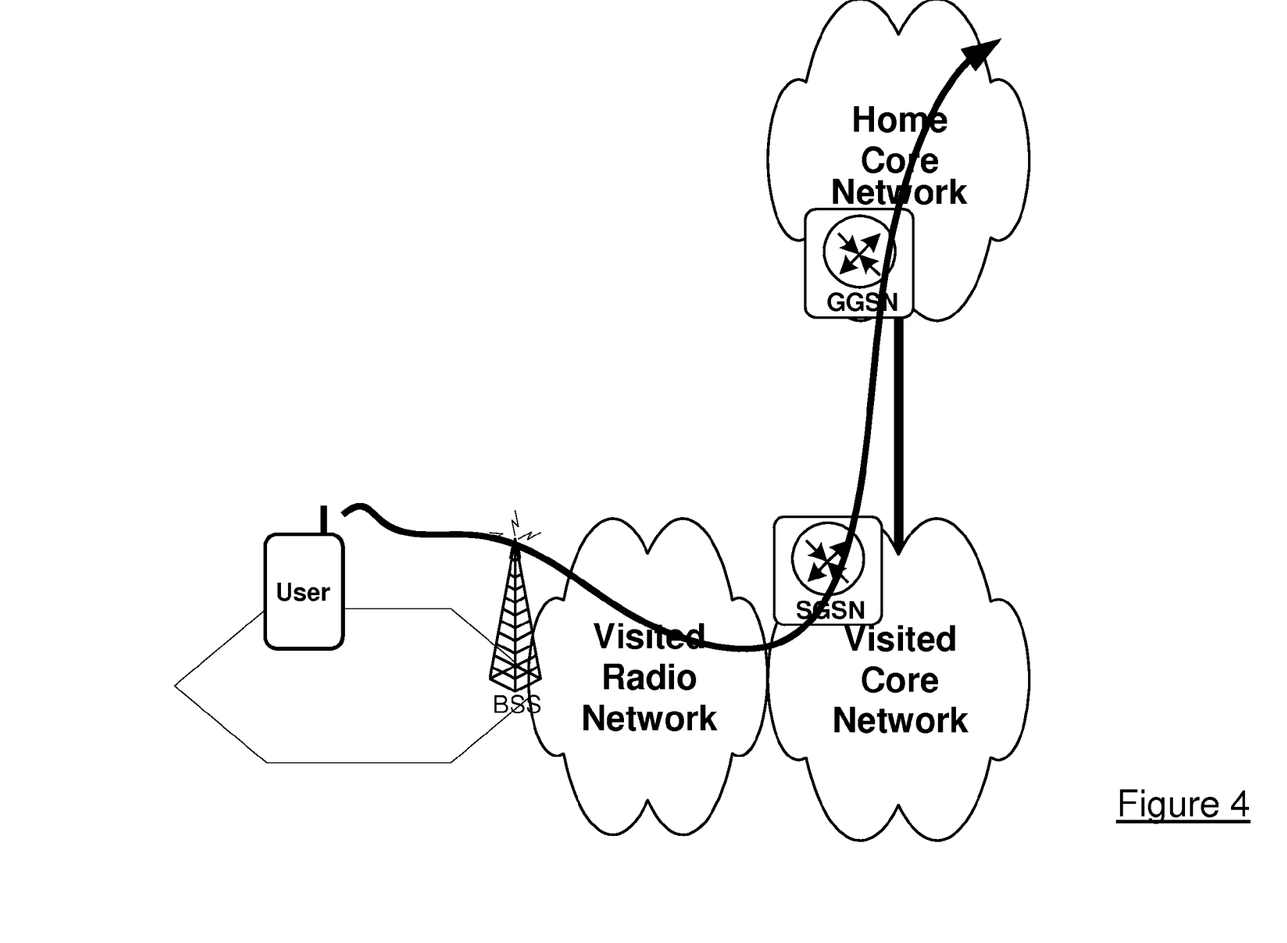
FIG. 4 illustrates schematically the routing of traffic associated with roaming subscribers in a visited network, to a home network.

A problem arises when certain traffic conditions are detected in a visited network for roaming subscribers, i.e. subscribers for whom the visited network is not a home network. These conditions are, for example, congestion in a cell due to roaming subscribers, congestion in the whole visited network due to roaming subscribers at peak hours, etc. FIG. 4 illustrates this problem which shows a subscriber roaming in a visited network, and attached to a Base Station Subsystem that controls a cell area. Traffic is routed through the radio network towards the core network, where it will be routed onwards to the home network. Typically, the SGSN is the node in the visited network which connects to the home network, where the anchor point is the GGSN.

As will be appreciated from the previous discussion, analysis of traffic and policy enforcement occurs in the GGSN/PCEF, so, for roaming subscribers, this analysis and policy enforcement will happen in their home networks, not in the visited network. The QBAL (or other) mechanism is typically used by the network operators to avoid congestion problems within specific cells. Now, if the visited network operator wants to apply QBAL in a given cell, it can apply it to its home subscribers (the local PCRF communicating with the local GGSN/PCEF to enforce local policy), but not to roaming subscribers, since their traffic "escapes" from the visited network operator's control via the local SGSN. The visited network operator has no control over the policies applied to the roaming subscribers' traffic routed through the home GGSN, and equally the home network operator has no knowledge of local (cell) traffic levels in the visited network.

Figure 5:
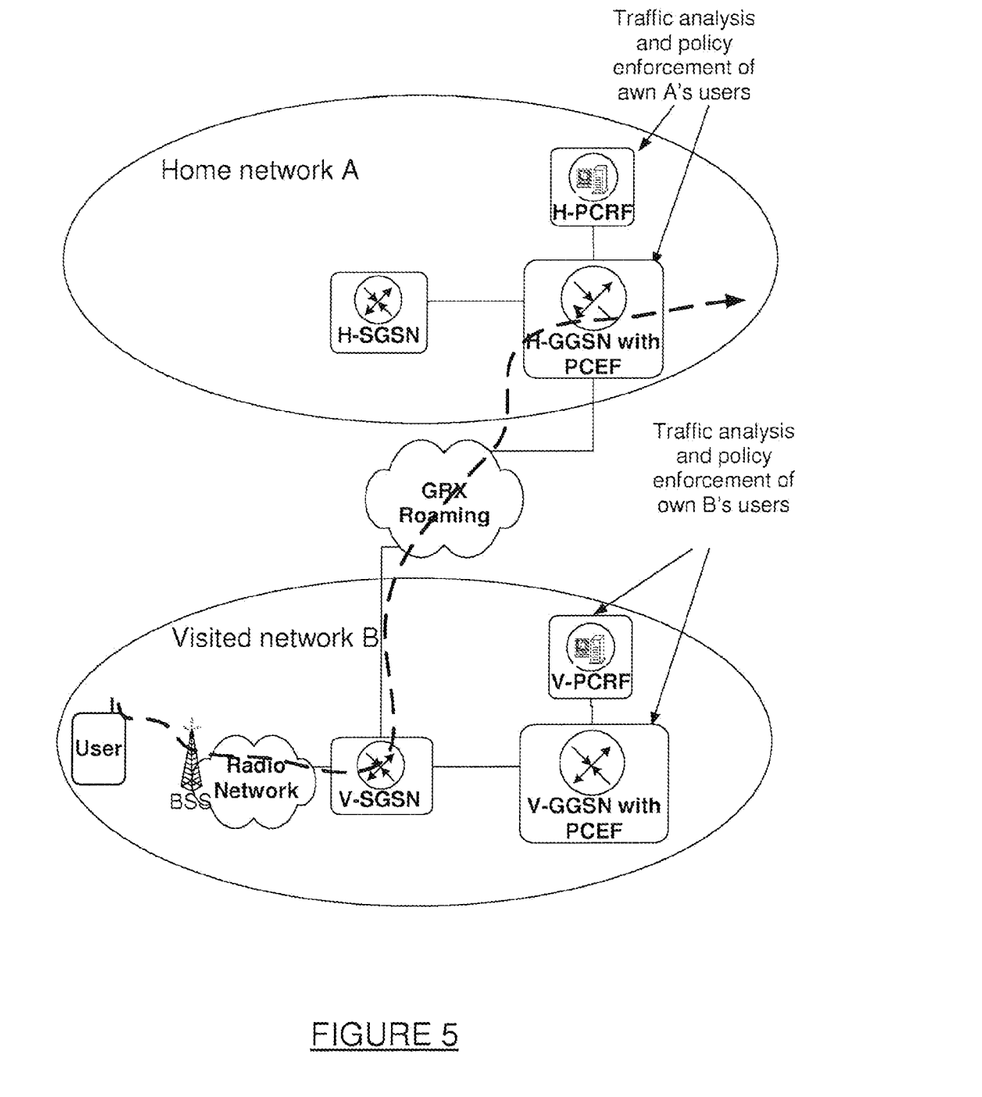
FIG. 5 illustrates schematically QoS and traffic control within an architecture such as that of FIG. 4.

This situation may happen often in cells where roaming subscribers frequently connect: airports, convention centres, etc. If the visited network operator wants to have reliable control of the aggregated load in its cells, that operator will just control the traffic originated by its own subscribers via the local GGSN/PCEF, but this aggregated traffic may differ tremendously from reality, since roamers may be using a high bandwidth. The consequence may be that the aggregated load in certain cells becomes impossible to manage by the visited network operator. FIG. 5 illustrates this scenario in more detail.

SUMMARY

It is an object of the present invention to provide a mechanism for effectively controlling traffic load within a given network domain, in respect of both home and roaming subscribers. This is achieved at least in part by introducing into the network architecture a central roaming agreement control node, for example a "central" Policy and Charging Rules Function, which communicates with both a visited network and home networks to apply policies to roaming subscribers that are appropriate given current traffic conditions in the visited network.

According to a first aspect of the present invention there is provided a method of controlling load within a cellular telecommunications network due to packet data traffic, where packet data traffic associated with subscribers roaming in said network is broken out to respective access gateways in the subscribers' home networks. The method comprises, within said cellular telecommunications network, identifying peer networks whose subscribers are currently roaming in the network. Upon detection of a congestion event within the network, a notification is caused to be sent to one or more of said peer networks. Upon receipt of the notification at the or each peer network, a reduction in the packet data traffic bandwidth available to those of said roaming subscribers belonging to the peer network is caused, wherein the packet data traffic associated with those subscribers in said cellular telecommunications is reduced.

In an example architecture, said cellular telecommunications network and each of said peer networks comprises a General Packet Radio Service core network, and each of said access gateways is a General Packet Radio Service Gateway Support Node. According to this architecture, said step of identifying peer networks whose subscribers are currently roaming in said network is carried out at a Serving Gateway Support Node.

The method may be used to control load within a cell of said cellular telecommunications network, wherein said subscribers are roaming in that cell and said congestion event is detected within the cell. In this case, said reduction in the packet data traffic bandwidth available to those of said roaming subscribers results in a reduction in associated packet data traffic in the cell.

An aggregate packet data traffic level for subscribers of said peer networks may be monitored at the Serving Gateway Support Node, and this level reported to a General Packet Radio Service Gateway Support Node of said cellular telecommunications network. At the General Packet Radio Service Gateway Support Node of said cellular telecommunications network, a total aggregate packet data traffic level for all roaming subscribers within said cell may be monitored to detect a congestion event. In this case, said step of causing a notification to be sent to one or more of said peer networks may comprise sending from said General Packet Radio Service Gateway Support Node of said cellular telecommunications network, to a central roaming agreement control node, a report identifying the congestion event and said peer networks.

Considering this scenario further, said step of causing a notification to be sent to one or more of said peer networks further may comprise, upon receipt of said report at said central roaming agreement control node, for the or each peer network, carrying out the following steps:

determining an action to be taken and sending that action to a General Packet Radio Service Gateway Support Node of the peer network; and applying said action at the receiving General Packet Radio Service Gateway Support Node to effect said reduction in the packet data traffic bandwidth available to those of said roaming subscribers belonging to the peer network.

The General Packet Radio Service Gateway Support Node of the peer network may include a Policy and Charging Enforcement Function. The central roaming agreement control node may in turn include a Policy and Charging Rules Function for interfacing with said Policy and Charging Enforcement Function.

The method may further comprise including in said report, Access Point Names to identify said peer networks, the central roaming agreement control node performing a DNS lookup using the Access Point Names to determine contact IP addresses for the General Packet Radio Service Gateway Support Nodes of the peer networks. A contact address of a Policy and Charging Rules Function of said cellular telecommunications network may be included within said action, wherein a General Packet Radio Service Gateway in a peer network is able to report on traffic levels to said Policy and Charging Rules Function. An identity of said cellular telecommunications system and, optionally, an identity of said cell may also be included in said action.

In order to aid a peer network in controlling traffic load, the notification sent to it may include an identity of a cell in which a congestion event has occurred.

The method can be applied in a CDMA network, where said access gateways are Packet Data Service Nodes.

Applying the method to a 3GPP network architecture, the peer network may comprise a Policy and Charging Enforcement Function node coupled to an access gateway, said step of causing a reduction in the packet data traffic bandwidth available to those of said roaming subscribers belonging to the peer network comprising applying actions at one or both of the access gateway and the Policy and Charging Enforcement Function node.

According to a second aspect of the present invention there is provided apparatus configured to provide central roaming agreement control to assist with controlling load within a cellular telecommunications network due to packet data traffic. The apparatus comprises a database containing inter-operator roaming agreements and a receiver for receiving from said cellular telecommunications network, an overload notification identifying at least one peer network. There is also provided a decision unit for inspecting said database to identify an action or actions to be applied in the or each said peer network, and a sender for sending a report to the or each peer network containing an identified action or actions.

The sender may be configured to include in the or each report an identity of said cellular telecommunications network and, optionally, a cell identity to identify a cell in which said overload is occurring.

The decision unit may be configured to perform a DNS lookup on one or more Access Point Names contained in an overload notification to identify contact IP addresses for the peer networks, and to pass the IP addresses to said sender.

When employed in 3GPP network architecture, the apparatus may be configured as a Policy and Charging Rules Function.

According to a third aspect of the present invention there is provided an access gateway for handling packet data traffic within a home network. The access gateway comprises a packet data handler for handling packet data flows associated with subscribers of the home network currently roaming in a visited cellular telecommunications network, and a receiver for receiving a notification of an overload condition within said visited cellular telecommunications network to which said subscribers are contributing. The packet data handler is configured to respond to said notification by causing a reduction in the packet data traffic bandwidth available to said roaming subscribers.

According to a fourth aspect of the present invention there is provided an access gateway for handling packet data traffic within a cellular telecommunications network. The access gateway comprises a packet data handler for handling packet data flows associated with subscribers of said cellular telecommunications network and roaming subscribers of one or more peer networks, and a congestion detector for detecting a congestion event in said cellular telecommunications network and, upon detection of such a congestion event, for causing a notification to be sent to said one or more of said peer networks to instruct a reduction in the packet data traffic bandwidth available to those of said roaming subscribers belonging to the peer network. This results in the packet data traffic associated with those subscribers in said cellular telecommunications network being reduced.

The congestion detector may be configured to cause a notification to be sent to said one or more of said peer networks by sending a congestion report to a central roaming agreement control node, the report identifying the congestion event and said peer networks.

The access gateway may be one of a General Packet Radio Service Gateway Support Node or a Code Division Multiplex Network Packet Data Node.

According to a further aspect of the present invention there is provided a Serving GPRS Support Node (SGSN). This includes as novel functionality an ability to monitor roaming users, and to group them according to their home networks, and, once they are grouped per home network, to split them into sub-groups, per cell ID. The SGSN maintains an "accumulator" per sub-group of roamers, where their aggregated load is computed and updated constantly. It reports accumulator values, with the home network id, cell ID, etc. to the local (visited) GGSN/PCEF.

DETAILED DESCRIPTION

Figure 6:
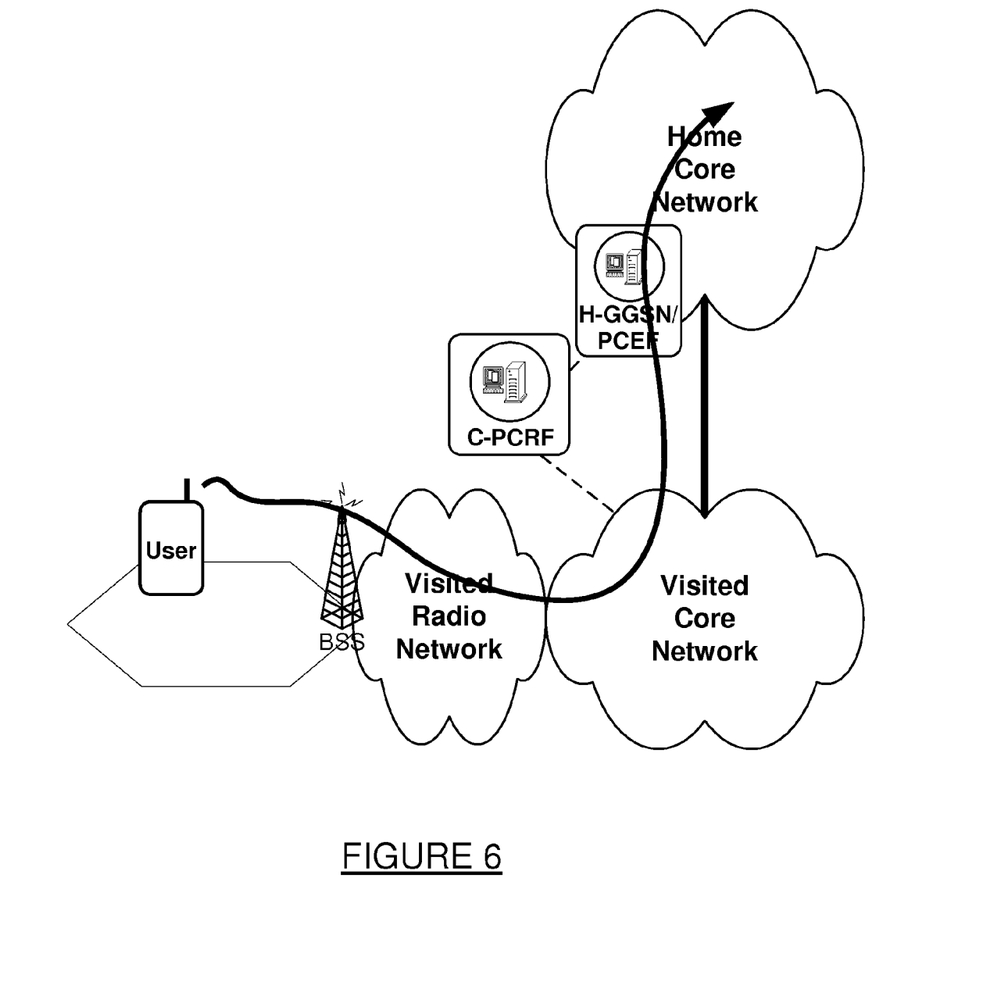
FIG. 6 illustrates schematically a PCC architecture employing a central PCRF for handling roaming subscribers.

In order to address the problem of applying policies to mobile subscribers roaming in a visited (cellular) network, it is proposed here to introduce a Central Policy and Charging Rules Function (C-PCRF) to enforce roaming agreements between home and visited network operators. This C-PCRF will receive information, from a visited network, identifying traffic problems being caused by roaming subscribers and the home networks (HPLMNs) to which these subscribers belong. The C-PCRF will analyze and enforce roaming agreements between the home and visited network operators, and will inform the home network operator(s) of actions taken. FIG. 6 illustrates schematically the coordinating role of the C-PRFC. The principle functions of the C-PCRF are:

1. To define a policy for handling traffic due to subscribers roaming in a first network and being subscribed to a second network. The policy includes an action to be performed by a gateway of the second (home) network over traffic data flows routed by said gateway and which are due to subscribers who are roaming in the first (visited) network and who are subscribers of the second (home) network.
2. To receive a notification of traffic congestion from a node in the first (visited) network, the notification comprising an identifier of the first (visited) network and an identifier of the second (home) network. The notification may further specify the nature of the congestion, e.g. cell congestion, peak hour congestion, etc. This node in the first network may be a GGSN (or a Foreign Agent in a CDMA network), or possibly an SGSN. If a total load control in the visited network is implemented, the node in the first network can be a PCRF (which, e.g., can receive traffic load information from other nodes in said network, such as GGSN/PCEFs).
3. To send the corresponding policy rule (action), which may vary depending upon the nature of the congestion event, to a node in the second (home) network. This node in the second network may be the GGSN/PCEF.

It is important to note that the C-PCRF does not store information at a subscriber level, but rather stores information in respect of a "block" of users, i.e. roaming subscribers belonging to a given (home) network. When a certain situation has to be reported (to a home network), the report will apply to all subscribers contributing to the problem.

Considering the C-PCRF architecture in more detail, a visited network is responsible for managing traffic in its own cells, and in particular will record the level of traffic resulting from roaming subscribers. Also, the visited network has to provision the maximum bandwidth allowed for these roaming subscribers in order to trigger reporting towards the C-PCRF when that limit is reached. Table 4 shows an exemplary control table provisioned in a visited network. Taking this table as an example, when a roaming subscriber begins generating traffic in a cell (for example 4556-1), the visited network will identify and store the subscriber's home network (using the Mobile Network Code (MNC) in combination with a Mobile Country Code (MCC)), and also its Access Point Name(s) APN. The visited network will monitor, for each group of roaming subscribers (identified by a common MNC-MCC) and for each cell, the aggregated traffic load, as well as the aggregated traffic load for all roaming subscribers per cell, and will compare these to the maximum allowed levels in the cell. The maximum allowed level is varied dynamically, depending upon the aggregated traffic level generated by home subscribers (i.e. fixed level—OwnAggregated). This gives home subscribers priority over roaming subscribers.

Considering further cell 4556-1, the visited network will sum traffic generated by Movistar™ Spain's subscribers (3.4 Mbps), Telecom Italia™ (13.6 Mbps), and so on. The total load per cell of all groups is also calculated, that is: 3.4+13.6+4.1=21.1 Mbps for cell 4556-1, etc. The limit for the roamers in cell 4556-1 is (100—OwnAggregated), which means that if at that moment OwnAggregated for the cell is lower than 78.9 (100−78.9=21.1), the C-PCRF need not be notified of any overload condition. If however the total sum reaches the maximum allowed aggregated load, the visited network notifies the C-PCRF. By way of example, if the visited network is Telia Sweden, this network may report a congestion situation to the C-PCRF, which, according to the table, will instruct the Movistar Spain network to Degrade QoS for non-premium subscribers.

The "Number of attached subscribers" column in the provisioned table (Table 4) is not used to calculate aggregated load or to determine if a limit has been reached. Rather, it is used to determine how many subscribers are attached at the time of a congestion detection. If, subsequently, the number of subscribers decreases significantly, this might be used to inform (at the C-PCRF) any decision made regarding an end to congestion. [This approach to detecting an end to congestion is preferred, as merely ending the congestion control action when the volume of traffic in the visited level falls to an accepted level may merely result in the volume oscillating between acceptable and unacceptable levels.] Similarly, the APN names are not used to calculate aggregated load, but are used to contact the home network when the C-PCRF has detected an overload condition.

Table 5 illustrates an exemplary table that is stored in the C-PCRF and which defines certain inter-operator agreements (although the actions may also be defined unilaterally by a network). The columns of the table may be provisioned as follows:

Subscribers' visited network: Sent by the visited network itself, when the visited network contacts C-PCRF Problem reported: Sent by the visited network Subscribers' home network: Sent by the visited network. The C-PCRF will store the address or identifier of the home network PCEF. This identifier, if not received from the visited network in the form of an APN, will be used to contact the home network PCEF once an action has been decided.

Action: Statically stored in the C-PCRF. This may be changed by certain provisioning tasks.

Table 5 includes only a "Cell congestion" problem. Of course, this can be further refined. For example, a notified problem may be "Congestion at peak hours". In this case, the C-PCRF maintains and makes reference to a further table (similar to Table 5) which maintains actions for this problem type.

A detailed description of the C-PRCF based architecture and service is now presented. This assumes that the logical entity in the visited network reporting to the C-PRCF is the GGSN/PCEF. A table such as Table 4 is therefore provisioned and maintained in GGSN/PCEF.

The GPRS Roaming eXchange (GRX) is the network currently used for inter-operator signalling. This GRX is used for example to connect the SGSNs in the visited networks to the GGSNs in the home networks. The GRX can be used to connect the visited and home networks with the C-PCRF.

Figure 7:
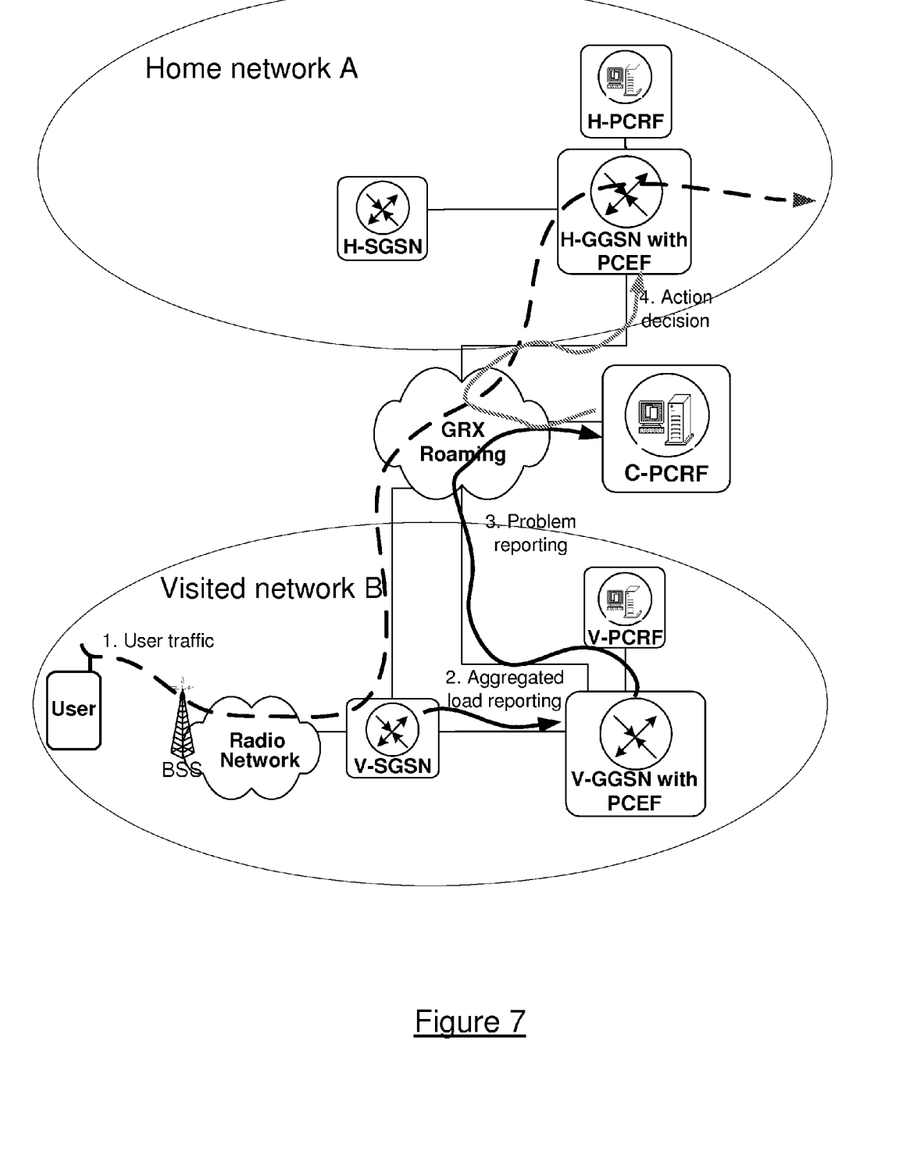
FIG. 7 illustrates a QoS/traffic control mechanism implemented in an architecture such as that of FIG. 6.

FIG. 7 shows a sequence of events that occur when congestion arises in a certain network cell. These are as follows:
1. A subscriber roaming in the visited network initiates its session and starts a data flow using any available service (P2P, VoIP, HTTP browsing, etc.).
2. The SGSN in the visited network (V-SGSN) detects (for example by analyzing an IMSI included in a session setup message) that there is a roaming subscriber generating traffic, and it reports the situation to the visited GGSN/PCEF (V-GGSN with PCEF). The SGSN will aggregate the traffic load being used by any other subscriber of the same operator, in the same cell. For subscribers of a different operator, in the same cell, separate reporting will be used.

The SGSN will use a modified DIAMETER Credit Control message to report load usage to the visited network GGSN/PCEF, including in the message both the network identifier of the roaming subscriber group, and the aggregated load for these subscribers. In particular, the SGSN will report, at certain intervals, the aggregated load of each group to the visited network GGSN/PCEF. The SGSN is not itself able to detect the congestion situation; it merely reports on aggregated loads to the GGSN/PCRF. The DIAMETER message used for this purpose is a preferably a Credit Control Request/Answer (CCR/CCA), see IETF RFC 4006. As will be apparent from Table 4, the data to be conveyed to the visited network GGSN/PCEF includes within the DIAMETER message at least certain of the following AVPs and attributes:

Home operator of the subscribers causing the congestion
      "3gpp-IMSI-MCC-MNC"
      This is a 3GPP Vendor specific attribute, that is currently used in some RADIUS messages. Note that the RADIUS attributes can be reused in DIAMETER messages. In the present case, it will be included in a CCR message.
    Aggregated load
      Multiple-Services-Credit-Control ::=<AVP Header: 456>
        [Granted-Service-Unit]
        [Requested-Service-Unit]
        *[Used-Service-Unit]
        [Tariff-Change-Usage]
        *[Service-Identifier]
        [Rating-Group]
        *[G-S-U-Pool-Reference]
        [Validity-Time]
        [Result-Code]
        [Final-Unit-Indication]
        *[AVP]
      This data structure is taken from RFC 4006 (Diameter Credit-Control application). The Used-Service-Unit can serve for this purpose     Cell ID
      "3gpp-User-Location-Info"
      This is a 3GPP Vendor specific attribute that is currently used in some RADIUS messages. In the present case, it will be included in a CCR message.
    APN(s) being used by roaming subscribers
      "CalledStationID"
      This attribute belongs to the RADIUS base protocol IETF RFC 2865. This attribute will be repeated if several APNs are being used by the roaming subscribers.
    Number of attached subscribers per subscriber group or per operator
      "Number-of-attached-users"
      This is a new AVP.
3. The visited GGSN/PCEF receives the "per network" reports from the SGSN and adds them together to generate the total aggregated load for all roaming subscribers within a given cell. If the aggregated load limit is reached, this congestion situation is communicated to the C-PCRF. When communicating to the C-PCRF, the following data shall be included:
    Home operator(s) of the subscribers causing the congestion (a composite report can be sent for all home networks, or one report sent per network)
    Visited network's own identity
    Cell ID
    APN(s) of the roaming subscribers
    Problem reported (in this case, "Cell congestion")

The DIAMETER message used to communicate this information to the C-PCRF can again be the CCR/CCA. The same AVPs set out in step 2 above can be used to carry the home operator of the subscribers and the Cell ID. For the other parameters, the proposed AVPs are:
    Visited network own identity
      "3gpp-SGSN-MCC-MNC"
      This is a 3GPP Vendor specific attribute that is currently used in some RADIUS messages. Here, it will be included in a CCR message.
    Problem reported (in this case, "Cell congestion")
      This is a new AVP that will contain predefined values such as "Cell congestion", "Visited Network congestion", etc.
4. When the C-PCRF receives a congestion report, it will check in the roaming agreements list (e.g. Table 5) and take the appropriate action. Instructions from the C-PRCF can be sent to the home GGSN/PCEF(s) (H-GGSN/PCEF) using the DIAMETER protocol, e.g. with CCR/CCA messages. When communicating an action to a home GGSN/PCEF, the following data will be included:
    Visited network where the roaming subscribers are causing congestion
      "3gpp-SGSN-MCC-MNC"
      Same parameter as in previous cases
    Cell ID where the roaming subscribers are causing congestion (this data, with the Visited Network identifier, will allow the home GGSN/PCEF to identify the roamers and take the appropriate actions)
      "3gpp-User-Location-Info"
      Same parameter as in previous cases
    Action
      This is a new AVP. The possible roaming actions are explained as follows:
        Degrade QoS for roaming subscribers. The home network GGSN/PCEF must degrade the QoS for those of its subscribers who are causing congestion in the visited network.

Block roaming subscribers' traffic. The home network GGSN/PCEF must block the traffic for those of its subscribers who are causing congestion in the visited network.

Allow traffic as in their home network. The home network GGSN/PCEF will apply traffic analysis, content filtering, etc, to the roaming subscribers as if they were in the home network.

Degrade QoS for non-premium subscribers. All roaming subscribers who are not premium subscribers will see their traffic QoS decrease.

Block high-bandwidth traffic. This action helps to reduce bandwidth while still permitting subscribers to access basic services (HTTP browsing, e-mail, etc). The concept of "high-bandwidth" traffic must be agreed beforehand between the home and visited operators.

Redirect control to visited GGSN/PCEF. This action will require that the C-PCRF provide the address of the visited network PCRF to the home network GGSN/PCEF. The home network GGSN/PCEF will then start reporting traffic usage to the visited network PCRF. As roaming subscribers' provisioning data does not exist in the visited network PCRF (which only stores information for its own subscribers), a default category will be defined in the visited network PCRF which will instruct the home network GGSN/PCEF to act accordingly.

In order to contact a home network GGSN/PCEF, the C-PCRF makes use of the appropriate APN name(s). The C-PCRF will use a DNS in the GRX roaming domain to obtain an IP address of a home network GGSN/PCEF using an APN. This is similar to the procedure used when a PDP context is established on behalf of a UE, and where the SGSN must obtain the IP address of the GGSN for GTP tunnel establishment. Of course, where a report (from the visited GGSN) includes multiple APNs, the C-PCRF will communicate actions to all respective APNs.

When the home network GGSN/PCEF(s) receives actions from the C-PCRF, it will also receive the following data:

Identity of the visited network where the home network's roaming subscribers are causing congestion;

The Cell ID where the subscribers are causing congestion. This data, with the Visited Network identifier, will allow the home network GGSN/PCEF to identify the relevant roaming subscribers.

If the H-GGSN/PCEF entities are not co-located, the H-GGSN will act as a DIAMETER proxy towards the H-PCEF, forwarding all DIAMETER messages received by the C-PCRF.

After these steps have been performed, the visited network must continue to monitor the aggregated load in order to allow it to detect an end to congestion or other situation. The SGSN in the visited network will continue sending reports as in step 2 above and, based on these reports, the visited network GGSN/PCEF will update Table 4 in real-time. For example, the visited network GGSN/PCEF can decide that the "Cell congestion" problem has ended upon either of the following events occurring:

The aggregated load due to the visited network's own subscribers (parameter OwnAggregated in Table 4) decreasing significantly (perhaps allowing for some time lag); or The number of attached roaming subscribers in the cell decreasing significantly, to below a predefined threshold.

The visited network GGSN/PCEF communicates to the C-PCRF that the actions taken previously should now be revoked. The visited network GGSN/PCEF will send to the C-PCRF the same data as in step 3 above, together with an indicator denoting "End of problem reported". The C-PCRF will report this end of problem to the home network GGSN/PCEF(s).

Figure 8:
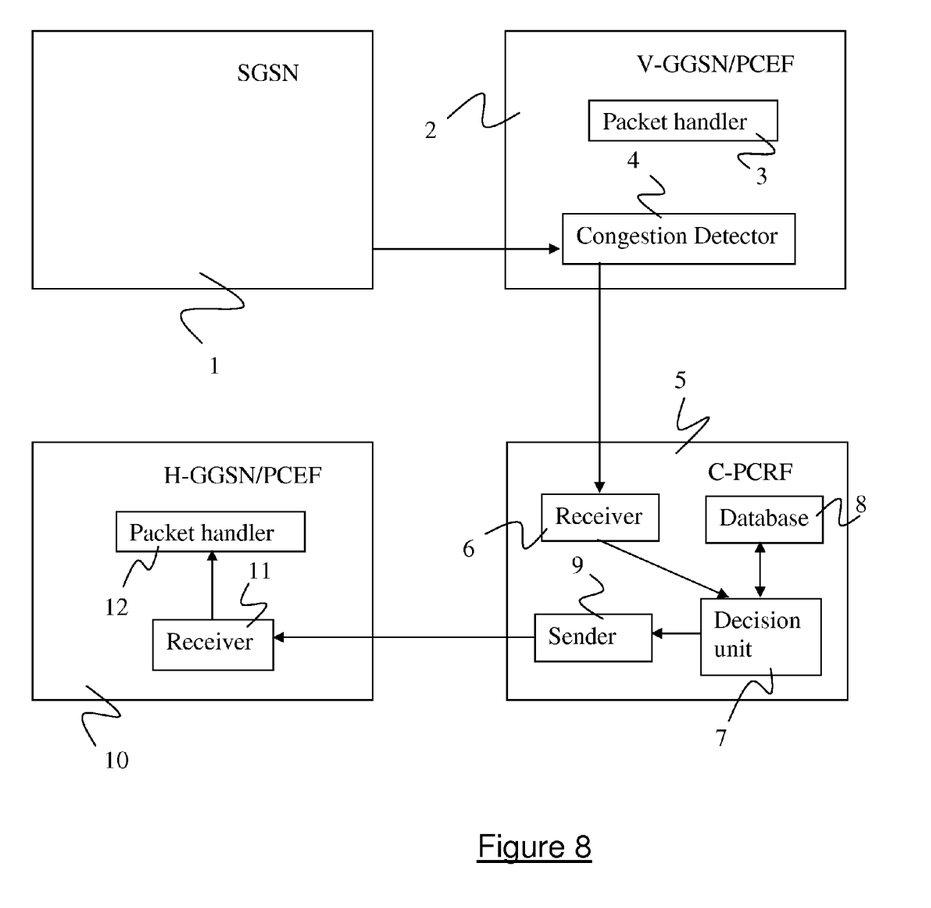
FIG. 8 illustrates schematically various network nodes of the architecture of FIG. 7 including visited and home network GGSN/PCEFs, a SGSN, and a central PCRF.

FIG. 8 illustrates schematically certain nodes required to implement the mechanisms described above, in the context of GPRS roaming. Within a visited network, an SGSN 1 provides aggregate traffic load reports (for roaming subscribers) to a V-GGSN 2. The V-GGSN 2 comprises a packet handler 3 for handling packet data flows according to conventional procedures. The packet handler 3 includes a PCEF for controlling packet flows of home subscribers. A congestion detector 4 within the V-GGSN receives traffic load reports from the SGSN 1 and uses these to detect congestion due to roaming subscribers. Upon detection of a congestion event, the congestion detector 4 sends a report to the C-PCRF 5. This is received at a receiver 6 of the C-PCRF and is passed to a decision unit 7. The decision unit then inspects a database 8 that contains an action table (see for example Table 5) in order to identify an action to be applied for a given peer network (identified in the congestion report). A sender 9 then sends a further notification, containing the action (and identifying the visited network and cell in which congestion is occurring), to a H-GGSN/PCEF 10. This is received at a receiver 11, and is passed to a packet handler 12 which is responsible for controlling the packet flows of home subscribers, including those that are roaming. The packet handler adjusts the bandwidth available to roaming subscribers in the congested cell, e.g. by downgrading their service level.

Currently, many of the nodes and servers in telecommunications systems are implemented by computer-based apparatuses. Accordingly, computer programs comprising computer-readable program codes are loaded in computer-based apparatuses of these systems causing them to behave according to a predefined manner, as determined by the respective program codes, which are in accordance to the functionality specified for the servers/nodes these apparatuses implement. Thus, those skilled in creating and/or modifying computer programs, would, without departing of the teachings of the present invention, readily apply them to create and/or modify computer programs suitable to be loaded in computer-based apparatuses, such as the ones described herein, so as to make them to behave according to any of the described embodiments.

It will be appreciated by the person of skill in the art that various modifications may be made to the above described embodiments without departing from the scope of the present invention. For example, whilst the traffic control approach has been described above with reference to controlling the traffic load on a per cell basis, the approach may be applied across an entire visited network (in which case the visited GGSN may need to sum aggregate data received from multiple SGSNs within the visited network), or across a subset of cells with a network. The approach could also be applied for roaming subscribers in respect of a given service, e.g. VoIP, across a cell, cell set, or sub-network (e.g. a certain SGSN area in the visited network), so that the visited network operator can limit traffic roaming subscribers use in respect of certain services.

TABLE 1

| Type of traffic | Subscriber's subscribed policies | Action |
|---|---|---|
| HTTP browsing | Time of day: 8:00-20:00 | Charge by volume |
| HTTP browsing | Time of day: rest of the day | Free charging |
| Skype ™ | — | Block |
| MMS | Postpaid subscriber | Charge by event |
| MMS | Prepaid subscriber | Charge by volume |
| ... | ... | ... |

TABLE 2

| ID | Maximum aggregated load (Mbps) | Measured aggregated load every 1 minute (Mbps) | Action when maximum is reached |
|---|---|---|---|
| 33589-1 | 100 | 3.4 | Throttle all subscribers to 50% of bandwidth |
| 8874-2 | 60 | 23.5 | Introduce jitter for VoIP services |
| 10998-1 | 40 | 36.7 | Block all services except HTTP browsing |
| ... | ... | ... | ... |

TABLE 3

| Charging characteristics | Maximum aggregated load (Mbps) | Measured aggregated load every 1 minute (Mbps) | Action when maximum is reached |
|---|---|---|---|
| 1 (Gold subscribers) | 1000 | 233.6 | Block Skype |
| 2 (Silver subscribers) | 800 | 562.4 | Block any VoIP service |
| 3 (Bronze subscribers) | 500 | 126.3 | Only allow HTTP browsing |
| ... | ... | ... | ... |

TABLE 4

| Cell ID | Maximum aggregated load allowed for roamers (Mbps) | Roamers' Network operator | Roamers' APN(s) | Number of attached subscribers | Aggregated load (Mbps) |
|---|---|---|---|---|---|
| 4556-1 | 100 - OwnAggregated | Movistar Spain | wap.movistar.com | 23 | 3.4 |
| | | Telecom Italia | wap.tim.it gprs.tim.it | 77 | 13.6 |
| | | Optimus Portugal | gprs.optimus.pt | 15 | 4.1 |
| 8873-3 | 80 - OwnAggregated | Telenor | wap.telenor.com | 67 | 32.3 |
| | | O2 | gprs.o2.uk | 21 | 9.7 |
| ... | ... | ... | ... | ... | ... |

TABLE 5

| Subscribers' visited network | Problem | Subscriber's home network (with H-PCEF address) | Action |
|---|---|---|---|
| Movistar Spain | Cell congestion | T-Mobile US | Degrade QoS for |
| | | Vodafone UK | Block roamers' traffic |
| | | Movistar Chile | Allow traffic as in their home network |
| Telia Sweden | Cell congestion | Movistar Spain | Degrade QoS for non-premium |
| | | Vodafone Spain | Block high-bandwidth traffic (e.g. VoIP) |
| France Telecom | Cell congestion | Telecom Italia | Redirect control to PCRF |
| ... | ... | ... | ... |

The invention claimed is:

1. A method of controlling load within a cellular telecommunications network due to packet data traffic, the method comprising:
    receiving from the cellular telecommunications network an overload report that indicates an overload within said cellular telecommunications network and that identifies one or more peer cellular telecommunications networks as having roaming subscribers contributing to said overload;
    identifying one or more actions to be applied in said one or more peer networks based on inspection of a database containing inter-operator roaming agreements; and
    sending a notification to each of the one or more peer networks indicating the one or more identified actions to be applied, each notification including an identity of the cellular telecommunications network and a cell identity that identifies a respective cell in which the overload is occurring.

2. The method of claim 1, further comprising performing a Domain Name System (DNS) lookup on one or more Access Point Names contained in the overload report to identify contact Internet Protocol (IP) addresses for the one or more peer networks, and wherein said sending comprises sending each notification to a respective one of the identified contact IP address.

3. The method according to claim 1, wherein at least one of the identified actions includes reducing packet data traffic bandwidth available to roaming subscribers of one of said peer networks.

4. The method according to claim 1, wherein said cellular telecommunications network and each of said peer networks comprises a General Packet Radio Service core network.

5. The method according to claim 1, wherein said sending comprises sending the notification to a General Packet Radio Service Gateway Support Node of each of the one or more peer networks.

6. The method according to claim 5, wherein a General Packet Radio Service Gateway Support Node comprises a Policy and Charging Enforcement Function node, and wherein the method is implemented by a Policy and Charging Rules Function node configured to interface with a Policy and Charging Enforcement Function node.

7. The method according to claim 1, wherein a peer network comprises a Policy and Charging Enforcement Function node coupled to an access gateway, and wherein said sending comprises sending the notification to a peer network for application of said one or more actions at one or both of the access gateway and the Policy and Charging Enforcement Function node.

8. The method according to claim 1, wherein said cellular telecommunications network and each of said peer networks comprises a CDMA network.

9. The method according to claim 1, further comprising including within said notification a contact address of a Policy and Charging Rules Function of said cellular telecommunications network, to thereby enable a General Packet Radio Service Gateway in a peer network to report on traffic levels to said Policy and Charging Rules Function.

10. A method implemented by an access gateway for handling packet data traffic within a home cellular telecommunications network, the method comprising:
receiving a notification that indicates one or more roaming subscribers of the home network are contributing to an overload within a visited cellular communications network and that instructs the access gateway to apply one or more actions in the home network; and
extracting an identity of the visited network from the received notification;
extracting a cell identity from the received notification that identifies a cell of the visited network in which said overload is occurring;
in accordance with said notification, causing a reduction in packet data traffic bandwidth available to said roaming subscribers.

11. The method according to claim 10, wherein said causing comprises applying actions at one or both of the access gateway and a Policy and Charging Enforcement Function node.

12. The method according to claim 10, wherein said home network and said visited network each comprises a General Packet Radio Service core network, and wherein the access gateway comprises a General Packet Radio Service Gateway Support Node.

13. The method according to claim 10, wherein said home network and said visited network each comprises a CDMA network, and wherein the access gateway comprises a Packet Data Node.

14. A method implemented by an access gateway for handling packet data traffic within a cellular telecommunications network, the method comprising:
detecting a congestion event within the cellular telecommunications network; and
responsive to detection of the congestion event, causing a notification to be sent to one or more peer cellular telecommunications networks that have subscribers roaming in the cellular telecommunications network, said notification:
instructing those peer networks to reduce packet data traffic bandwidth available to said roaming subscribers; and
including an identity of the cellular telecommunications network and a cell identity that identifies a cell in which the congestion event is occurring.

15. The method according to claim 14, wherein said detecting comprises:
receiving reports of an aggregate packet data traffic level for said roaming subscribers; and
monitoring a total aggregate packet data traffic level for all roaming subscribers within a cell to detect a congestion event.

16. The method according to claim 14, wherein said causing comprises sending a report to a central roaming agreement control node that identifies the congestion event and said one or more peer networks.

17. The method according to claim 14, wherein said cellular telecommunications network and said peer cellular telecommunications networks each comprises a General Packet Radio Service core network, and wherein the access gateway comprises a General Packet Radio Service Gateway Support Node.

18. An apparatus configured to provide central roaming agreement control to assist with controlling load within a cellular telecommunications network due to packet data traffic, the apparatus comprising:
one or more processing circuits configured to:
access a database containing inter-operator roaming agreements;
receive from said cellular telecommunications network an overload report that reports an overload within said cellular telecommunications network and that identifies one or more peer cellular telecommunications networks as having subscribers contributing to said overload;
inspect said database to identify one or more actions to be applied in said one or more peer networks; and
send a notification to each of the one or more peer networks indicating the one or more identified actions to be applied, each notification including an identity of the cellular telecommunications network and a cell identity that identifies a respective cell in which the overload is occurring.

19. The apparatus according to claim 18, wherein the one or more processing circuits are further configured to perform a Domain Name System (DNS) lookup on one or more Access Point Names contained in the received report to identify contact Internet Protocol (IP) addresses for the one or more peer networks, and to pass the one or more IP addresses to said sender.

20. The apparatus according to claim 18, wherein the apparatus is configured to implement a Policy and Charging Rules Function.

21. An access gateway for handling packet data traffic within a home cellular telecommunications network, the access gateway comprising:
one or more processing circuits configured to:
handle packet data flows associated with subscribers of the home network currently roaming in a visited cellular telecommunications network; and
receive a notification that:
indicates that one or more of said roaming subscribers are contributing to an overload within the visited network;
instructs the access gateway to apply one or more actions in the home network;
includes an identity of the visited network and a cell identity that identifies a respective cell of the visited network in which the overload is occurring; and
in accordance with said notification, cause a reduction in packet data traffic bandwidth available to said one or more roaming subscribers.

22. An access gateway for handling packet data traffic within a cellular telecommunications network, the access gateway comprising:

one or more processing circuits configured to:
- handle packet data flows associated with subscribers of said cellular telecommunications network and roaming subscribers of one or more peer networks; and
- detect a congestion event in said cellular telecommunications network and, upon detection of such a congestion event, cause a notification to be sent to said one or more peer networks, the notification:
  - instructing that instructs those peer networks to reduce packet data traffic bandwidth available to said roaming subscribers; and
  - including an identity of the cellular telecommunications network and a cell identity that identifies a cell in which the congestion event is occurring.

23. An access gateway according to claim 22, wherein the one or more processing circuits are configured to cause said notification to be sent by sending a congestion report to a central roaming agreement control node, the report identifying the congestion event and said peer networks.

* * * * *